United States Patent Office 3,208,405
Patented Sept. 28, 1965

3,208,405
METHOD OF MAKING A CHEWING CANDY
Robert Beer, Apartado 128f, % Savoy Candy,
Caracas, Venezuela
No Drawing. Filed July 13, 1962, Ser. No. 209,771
4 Claims. (Cl. 107—54)

This is a continuation-in-part of application Serial No. 127,494, filed July 28, 1961, and now abandoned.

The present invention relates to a method of making a chewing candy.

Conventionally, chewing gum is produced in the form of strips, tablets, small balls or the like. Chewing gum is produced for human consumption either in uncovered form or covered with a sugar layer. Such sugar layer is formed of suitably colored and flavored sugar solution and must be adhered to the chewing gum or chicle gum core portion by an intermediate layer of a suitable adhesive substance such as gum arabic. The method of forming such composite, multilayer chewing gum balls or the like is time consuming and rather involved. The covering of the chewing gum core has to be carried out in several stages. It is generally required to allow the freshly formed gum core portions to stand for several days prior to covering of the same, then, the covering is carried out in three further steps, namely application of the intermediate adhesive layer, application of the sugar covering and, finally, application of a high gloss surface coating. Furthermore the individual chicle gum bodies or the like must be classified by size prior to covering of the same.

It is an object of the present invention to provide a far more simple and economical method for producing a covered chewing gum confection.

It is another object of the present invention to provide a method for producing covered chewing gum confections which can be carried out substantially in a single and continuous process.

The coated or covered chewing gum presently available, including those types which are called candy coated gum or similar descriptive terms, are generally made in the manner described broadly hereinabove.

It is a further object of the present invention to provide a chewing candy confection which in texture and mode of consumption will differ from that of conventional chewing gum.

Particularly, it is still another object of the present invention to provide a chewing candy so formed that the user upon insertion of the chewing candy into his mouth during a first period will obtain substantially the same effect as if he had taken a hard candy, and during a subsequent period, i.e., after the outer portion of the chewing candy has been dissolved in the user's mouth, will experience the same results as if he had taken an uncovered conventional chewing gum.

Other objects and advantages of the present invention will become apparent from a further reading of the description and of the appended claims.

With the above and other objects in view, the present invention is concerned with a method for producing a chewing candy, comprising the steps of injecting into the center portion of a deformable rod-shaped body of hard candy mass a deformable chewing gum mass so as to form a composite rod-shaped deformable body comprising a core portion of chewing gum mass covered by a tubular outer portion of hard candy mass; and constricting said composite rod-shaped body at points spaced from each other in longitudinal direction so as to sever the composite rod-shaped body at these points into a plurality of relatively short individual portions, simultaneously drawing part of the hard candy mass of the tubular outer portion in the area of constriction over the side faces of the severed chewing gum mass thereby substantially completely covering the chewing gum mass of each of the plurality of relatively short indivdual portions with hard candy mass thus forming a chewing candy consisting essentially of a core portion of chewing gum mass covered by a layer of hard candy mass.

The present invention also contemplates a chewing candy comprising, in combination, a core portion consisting essentially of chewing gum mass, and a layer of hard candy mass substantially completely covering the core portion.

Thus, according to the present invention, the chewing candy will comprise an inner portion consisting essentially of a chewing gum mass which may be flavored in any desired manner, and this inner portion is covered by a hard candy.

Hard candies are well known in the art and are described for instance in the book, "Candy and Candy-Making," by Mary Bookmeyer, published by Charles A. Bennett.

The hard candy mass as well as the modified hard candy mass may of course be colored and flavored in any desired manner.

Thus, according to the present invention, a chewing gum mass whcih may be produced as described hereinbelow or in similar manner, is introduced into a still plastic hard candy mass in a manner which is somewhat similar to the introduction of jam or other fillings into filled hard candies of known type. However, according to the present invention, it is a chewing gum mass which is thus introduced and the resulting confection is entirely different from fruit or otherwise filled hard candies and combines the characteristics of a hard candy with that of a chewing gum. A simple example of the product of the present invention would be a lollipop which basically is a hard candy, having a core of chewing gum so that after sucking the lollipop for a while and dissolving the hard candy portion thereof, the chewing gum core will be exposed and chewed in the usual manner.

Apart from the novelty of the product made according to the present invention, it is important to note the great simplicity with which according to the present invention a coated chewing gum may be produced in continuous mass production and without requiring special machinery or installations beyond those which usually are available in a hard candy factory. Thus, without any appreciable additional investment, the present invention can be carried out in pactically any hard candy factory which operates with conventional mechanized equipment. Furthermore, according to the present invention, a confection is produced which combines the refreshing taste for instance of hard candies of the flavored acidic type with that of a typical chewing gum. Obviously, the number of combinations between the flavoring of the hard candy coating and of the chewing gum core are practically unlimited.

The chewing gum core may be produced by heating invert syrup of 43° Bé. in a steam-heated jacketed pressure vessel and under constant stirring to a temperature of about 100° C. and by dissolving for instance in 50 kilograms of heated invert syrup about 10 kilograms of chicle gum base, for instance of the ladco or paloja type. After the gum base has been dissolved, 15 kilograms of 45° Bé. glucose are added and a homogeneous mixture is formed. The mixture may be cloudy but must be completely smooth and free of gum agglomerates. Thereafter, the steam-heating is discontinued and the mass is maintained at a temperature of between 60° and 85° C. Flavoring ingredients may be added as desired. It is important that the mass until completely homogeneous is not cooled below 60° C.

In this manner, the mass is maintained in a semi-liquid condition. It is important, according to the present invention, to use a major proportion of invert sugar rather than glucose syrup for the chewing mixture and to incorporate only a relatively small portion of glucose syrup therein, because the viscosity of invert sugar syrup is more temperature dependent than that of glucose. Broadly, at higher temperatures, the viscosity of invert sugar will be reduced more than that of gucose syrup and, on the other hand, upon cooling, the viscosity of invert sugar will rise faster than that of glucose syrup. These characteristics of invert sugar are very important in connection with the process of the present invention according to which the thus-formed chewing gum mass while in semi-liquid state is to be injected into a body of still deformable hard candy mass, and is to solidify therein.

The further production steps are carried out in conventional machinery for the production of filled hard candies, for instance in an apparatus known as "Rostoplast," type 96A available from Hansellawerk, Viersen, Germany. The hard candy or caramel mass which is composed of the conventional ingredients and flavored as desired and which is to be used for the coating of outer layers of the chewing candy is cooked at 135° C. for instance in an apparatus known as "Universal Satzkochmaschine," Model SKH, available from the firm Haensel, Hannover, Germany. After the cooking point of 135° C. has been reached, the mass is subjected to subatmospheric pressure and the finished hard candy mass is then kneaded on a cold table and cooled in conventional manner. During kneading, coloring and flavoring ingredients, as well as acid such as citric acid may be added.

The still plastic hard candy mass is then extruded into rod shape in a center filling machine such as the Rostoplast mentioned above or a Gaebel-line. The semi-fluid viscous gum mass is introduced into the heated funnel of the injection pump device of the Rostoplast machine and is injected into the rod-shaped body of still deformable hard candy mass in a manner which is more or less similar to the injection of conventional jam or fondant filling into a hard candy mass. However, for the purpose of the present invention, the conduit connecting the pump with the copper filling tube of the Rostoplast machine or the like should be a flexible metal tube rather than the conventional rubber tube. This is important because the chewing gum mass might attack rubber tubing or the like at elevated temperatures.

The pump and flexible metal tube, for instance of bronze, may be washed after use with toluene or hot vegetable oil and then rinsed with hot water, in order to cleanse these portions of the apparatus of any residual chewing gum mass.

After thus injecting chewing gum mass into the hard candy mass and separating the rod-shaped candy body into individual candy portions so as to cover in each candy portion the chewing gum mass with hard candy or caramel mass, the thus formed chewing candies are allowed to cool and are then packed in conventional manner.

Candy center filling machines are too well known to require detailed description and, moreover, those mentioned above are, for instance, described in leaflets published in English and German by Hansella-Works Albert Henkel A.G., Viersen-Dusseldorf, Germany.

Surprisingly, I have found that with such conventional machinery for the production of filled candies my new chewing candy may be produced which is based on the combination of a chewing gum mass core of certain physical characteristics, primarily a relatively low viscosity at high temperatures and a relatively high viscosity at low temperatures, and a candy covering, however, a slight modification of the machinery is required.

With respect to the composition of the chewing gum mixture, it is important, according to the present invention, that the same must be in sufficiently liquid or at least semi-liquid state at elevated temperatures of between about 85 and 60° C. and preferably at lower temperatures down to about 38° C. to permit pumping of the mass. This is a required physical characteristic of the chewing gum mass according to the present invention which differs from that of conventional chewing gum masses which are produced in different manner and desired to be solid and shape retaining upon rolling and cutting. The semi-liquid consistency of the chewing gum mass at elevated temperatures which is desired according to the present invention is achieved by incorporating a sufficiently large proportion of invert sugar in place of some of the glucose or corn syrup which is incorporated in conventional chewing gum mass.

By incorporating invert sugar syrup in the chewing gum mass according to the present invention, the same will be adapted to being pumped and injected into the deformable candy mass provided that the temperature of the invert syrup-containing chewing gum mass does not drop below about 60° C.

The important modification of the conventional machinery which is required for producing the chewing candy of the present invention is the replacement of the conventional rubber tube through which candy mass may be pumped, with a flexible metal tube or a flexible tube of synthetic material such as Teflon which is sufficiently heat resistant and will not be attacked by the chewing gum mass.

The following examples of the production of a chewing gum mass according to the present invention are given as illustrative only, without limiting the invention to the specific details of the examples:

Example I 45 kilograms of pure, invert sugar, density 46–47° Bé. are preheated to a temperature of 100° C. and then put into a preheated, horizontal mixing-kneading machine with steamjacket and Z-shaped kneading arms. Then 12 kilograms of chicle bubble gum base are added, reduced to fine pieces, and mixed until these fine pieces are melted into very fine grains, which are in suspension in the invert sugar. Then 13 kilograms corn syrup (glucose syrup (glucose syrup) 46° Bé. are added, and the temperature will be kept above 65° C. while mixing constantly. After a certain time the chicle bubble gum base will be dispersed completely in the invert sugar-corn syrup mixture and a completely smooth, homogeneous and viscous mass is obtained. Now 1.5 kilograms dry icing sugar (finely ground sugar) are added, and for about 50 minutes kneading will be continued. Now the batch is ready for cooling to about 50° C. and flavors and colors in the necessary amounts and according to taste will be added. The batch is then ready to be used for filling in the chewing candy.

Example II 90 kilograms of invert sugar, 46° Bé. are heated to about 93° C. in a steam-heated cooking kettle and to this are added 27 kilograms of corn syrup of 46° Bé. This mixture is pumped into a horizontal, steamheated mixing-kneading machine with two Z-shaped kneading arms and the temperature is kept at 70° C. To this are added 25 kilograms of chicle bubble gum base reduced to fine pieces, at a constant temperature of 70° C. and all is well mixed until a completely homogeneous, smooth mass is obtained. Now 3.5 kilograms of dry ground sugar are added, and the kneading is continued for about 20 more minutes. If the batch will be used immediately, flavors, colors, etc., are added. However, if the product will be finished later on, then it will be possible to keep the mass semi-liquid in a heating cabinet or similar device, at a temperature of 38° C. It is important that the processing of this product must always be done while in a semi-liquid state, in other words, when still warm.

Example III 32 kilograms glucose syrup of 46° Bé. are put into a steamheated horizontal mixing-kneading machine and heated to 77° C. To this 100 kilograms invert sugar, density 46.5° Bé. are added and the mixture heated to 82° C. Hereto are added 30 kilograms of chicle bubble gum base in fine pieces, and mixed until the batch is smooth, homogeneous and viscous. Now the temperature is decreased to 60° C.; then 4 kilograms icing sugar are added and the mixing is continued for about another 20 minutes. The batch is now ready for adding flavors, colors, etc., and can then be put into the center-filling/pumping machine, which puts the chewing gum into the center of the chewing candy bonbon. This mass remains semi-liquid at temperatures of 43° C. and higher, and this property can be used when it is indicated to work up the batch at some later time. In this case it is necessary to keep the batch in a heated cabinet at the mentioned temperaure.

Chicle gum base is available under several trade names, for instance as "Ladco Bubble Base," from F. A. Dreyfus Co., South Plainfield, New Jersey.

It will be noted that during manufacture of the chewing mass the same should not be cooled below 60° C. because the chilled gum base is liquid or at least semi-liquid only at or above 60° C. and thus, in order to form a homogeneous dispersion of the chilled base in the invert/glucose syrup a temperature of at least 60° C. is required. Once the homogeneous dispersion or chewing gum mass has been formed, the temperature may be lowered as described in the examples.

These lower temperatures of 38° C., 43° C. or 50° C. are the keeping temperatures for the prepared chewing gum mass, i.e., the homogeneous dispersion of chilled base in syrup, at which the prepared mass will still be in semi-liquid injectable state.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. A method of producing a chewing candy, comprising the steps of injecting into the center portion of a deformable rod-shaped body of hard candy mass a deformable chewing gum mass being at a raised temperature not exceeding 85° C. and comprising 100 parts by weight of invert syrup, between 20 and 30 parts by weight of chicle gum base and about 30 parts by weight of glucose syrup, said deformable chewing gum mass being during injection despite said relatively low raised temperature thereof in a semi-liquid flowable state due to the major proportion of invert syrup therein, so as to form a composite rod-shaped deformable body comprising a core portion of chewing gum mass covered by a tubular outer portion of hard candy mass without substantially softening said hard candy mass by the raised temperature of said injected semi-liquid chewing gum mass; and constricting said composite rod-shaped body at points spaced from each other in longitudinal direction so as to sever said composite rod-shaped body at said points into a plurality of relatively short individual portions, simultaneously drawing part of the hard candy mass of said tubular outer portion into the area of constriction over the side faces of the severed chewing gum mass thereby substantially completely covering the chewing gum mass of each of said plurality of relatively short individual portions with hard candy mass thus forming a chewing candy consisting essentially of a core portion of chewing gum mass covered by a layer of hard candy mass.

2. A method of producing a chewing candy, comprising the steps of shaping a hard candy mass into a rod-shaped body while the same is in plastic, deformable condition; injecting into the center portion of said deformable rod-shaped body substantially along the longitudinal axis thereof a chewing gum mass being at a raised temperature not exceeding 85° C. and comprising a major proportion of invert syrup and minor proportions of chicle gum base and glucose syrup and being due to said major proportion of invert syrup therein during injection despite said relatively low raised temperature thereof in a flowable state, so as to form a composite rod-shaped substantially shape retaining but deformable body comprising a core portion consisting substantially of said chewing gum mass and a tubular outer portion formed by said hard candy mass without substantially softening said hard candy mass by the raised temperature of said injected semi-liquid chewing gum mass; and constricting said composite rod-shaped body at longitudinally spaced points thereof so as to draw in the area of constriction hard candy mass of said tubular outer portion over side faces of said core portion in such a manner as to separate said composite rod-shaped body into a plurality of individual chewing candies comprising, respectively, a core portion of chewing gum mass substantially completely covered by hard candy mass.

3. A method of producing a chewing candy, comprising the steps of shaping a hard candy mass into a rod-shaped body while the same is in plastic, deformable condition; injecting into the center portion of said deformable rod-shaped body substantially along the longitudinal axis thereof a chewing gum mass being at a raised temperature not exceeding 85° C. and comprising a major proportion of invert syrup and minor proportions of chicle gum base and glucose syrup and being due to said major proportion of invert syrup therein during injection despite said relatively low raised temperature thereof in a flowable state, so as to form a composite rod-shaped substantially shape retaining but deformable body comprising a core portion consisting substantially of said chewing gum mass and a tubular outer portion formed by said hard candy mass without substantially softening said hard candy mass by the raised temperature of said injected semi-liquid chewing gum mass; constricting said composite rod-shaped body at longitudinally spaced points thereof so as to draw in the area of constriction hard candy mass of said tubular outer portion over side faces of said core portion in such a manner as to separate said composite rod-shaped body into a plurality of individual chewing candies comprising, respectively, a core portion of chewing gum mass substantially completely covered by hard candy mass; and cooling said chewing candies below the deformation temperature thereof.

4. A method of producing a chewing candy, comprising the steps of shaping a flavored hard candy mass into a rod-shaped body while the same is in plastic, deformable condition; injecting into the center portion of said deformable rod-shaped body substantially along the longitudinal axis thereof a flavored chewing gum mass being at a raised temperature not exceeding 85° C. and comprising a major proportion of invert syrup and minor proportions of chicle gum base and glucose syrup and being due to said major proportion of invert syrup therein during injection despite said relatively low raised temperature thereof in a flowable state, so as to form a composite rod-shaped substantially shape retaining but deformable body comprising a core portion consisting substantially of said chewing gum mass and a tubular outer portion formed by said hard candy mass without substantially softening said hard candy mass by the raised temperature of said injected semi-liquid chewing gum mass; constricting said composite rod-shaped body at longitudinally spaced points thereof so as to draw in the area of constriction hard candy mass of said tubular outer portion over side faces of said core portion in such a manner as to separate said composite rod-shaped body into a plurality of individual chewing candies comprising, respectively, a core portion of chewing gum mass substantially completely covered by hard candy mass; and cooling said chewing candies below the deformation temperature thereof.

References Cited by the Examiner

UNITED STATES PATENTS

| | | | |
|---|---|---|---|
| 146,541 | 1/74 | Moore | 99—135 |
| 1,242,562 | 10/17 | Laskey | 107—1.4 |
| 1,267,320 | 5/18 | Fries | 99—135 |
| 2,156,810 | 5/39 | Garbutt | 107—54.6 |
| 2,256,190 | 9/41 | Bowman | 107—54.6 |
| 2,559,648 | 7/51 | Lindhe | 107—10 X |

WALTER A. SCHEEL, *Primary Examiner.*

BEATRICE H. STRIZAK, CHARLES A. WILLMUTH, ROBERT E. PULFREY, *Examiners.*